United States Patent
Mou

(10) Patent No.: US 11,710,211 B2
(45) Date of Patent: *Jul. 25, 2023

(54) METHODS AND SYSTEMS FOR REAL-TIME 3D-SPACE SEARCH AND POINT-CLOUD PROCESSING

(71) Applicant: Zhijing George Mou, Seattle, WA (US)

(72) Inventor: Zhijing George Mou, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,494

(22) Filed: Mar. 3, 2020

(65) Prior Publication Data
US 2022/0277414 A1  Sep. 1, 2022

Related U.S. Application Data

(63) Continuation-in-part of application No. 15/940,789, filed on Mar. 29, 2018, now Pat. No. 10,580,114.

(60) Provisional application No. 62/478,442, filed on Mar. 29, 2017.

(51) Int. Cl.
*G06T 3/00* (2006.01)
*G06T 9/00* (2006.01)
*G06T 3/40* (2006.01)
*G06T 9/40* (2006.01)

(52) U.S. Cl.
CPC .............. *G06T 3/0031* (2013.01); *G06T 3/40* (2013.01); *G06T 9/001* (2013.01); *G06T 9/40* (2013.01)

(58) Field of Classification Search
None
See application file for complete search history.

(56) References Cited

U.S. PATENT DOCUMENTS

| | | | | |
|---|---|---|---|---|
| 2010/0174721 A1* | 7/2010 | Mou | ................... | G06F 16/2448 707/769 |
| 2013/0297574 A1* | 11/2013 | Thiyanaratnam | ....... | G06T 9/005 707/693 |
| 2016/0117856 A1* | 4/2016 | Chang | ..................... | G06T 15/00 345/427 |
| 2018/0081995 A1* | 3/2018 | Horhammer | .......... | G06F 16/283 |

* cited by examiner

*Primary Examiner* — Nurun Flora
(74) *Attorney, Agent, or Firm* — Olympic Patent Works PLLC

(57) ABSTRACT

The current document is directed to a dimensional shuffle transform ("DST") that maps a 3D space to a one-dimensional space that preserves 3D neighborhoods within 1D neighborhoods within an implicit recursive hierarchical structure. The search for points in a 3D subspace is reduced, by the DST, to one or more searches in the transformed 1D space. The search is performed by either recursive decomposition of the 3D region indexed by the transform into subspaces, exploiting the transformed space structure, or by direct indexing into the region of interest. The searches over the subspaces generated by recursive decomposition are independent from one another, providing many opportunities for a variety of parallel, DST-enabled search methods.

1 Claim, 8 Drawing Sheets

A White-Black Array with R=4, N=16.

FIG. 8

| rank: | 3 | | | | | | | 2 | | | | 1 | | 0 | |
|---|---|---|---|---|---|---|---|---|---|---|---|---|---|---|---|
| WHITE | | | | | | | | 83 | 67 | 59 | 21 | 76 | 33 | 45 | ✕ |
| BLACK | | | | | | | | | | | | | | 54 | |
| index: | 15 | 14 | 13 | 12 | 11 | 10 | 9 | 8 | 7 | 6 | 5 | 4 | 3 | 2 | 1 | 0 |

(a) Insert 54 into $Seg^b(0)$ for $Seg^w(0)$ is occupied

| rank: | 3 | | | | | | | 2 | | | | 1 | | 0 | |
|---|---|---|---|---|---|---|---|---|---|---|---|---|---|---|---|
| WHITE | | | | | | | | 83 | 67 | 59 | 21 | 76 | 33 | 45̶ | ✕ |
| BLACK | | | | | | | | | | | | 52 | 45 | 54 | |
| index: | 15 | 14 | 13 | 12 | 11 | 10 | 9 | 8 | 7 | 6 | 5 | 4 | 3 | 2 | 1 | 0 |

(b) Merge of $Seg^w(0)$ and $Seg^b(0) \Rightarrow Seg^b(1)$

| rank: | 3 | | | | | | | 2 | | | | 1 | | 0 | |
|---|---|---|---|---|---|---|---|---|---|---|---|---|---|---|---|
| WHITE | | | | | | | | 83 | 67 | 59 | 21 | 7̶6̶ | 3̶3̶ | 4̶5̶ | ✕ |
| BLACK | | | | | | | | 76 | 52 | 45 | 33 | 52 | 45 | 54 | |
| index: | 15 | 14 | 13 | 12 | 11 | 10 | 9 | 8 | 7 | 6 | 5 | 4 | 3 | 2 | 1 | 0 |

(c) Merge of $Seg^w(1)$ and $Seg^b(1) \Rightarrow Seg^b(2)$

| rank: | 3 | | | | | | | 2 | | | | 1 | | 0 | |
|---|---|---|---|---|---|---|---|---|---|---|---|---|---|---|---|
| WHITE | 83 | 76 | 67 | 59 | 52 | 45 | 33 | 21 | 8̶3̶ | 6̶7̶ | 5̶9̶ | 2̶1̶ | 7̶6̶ | 3̶3̶ | 4̶5̶ | ✕ |
| BLACK | | | | | | | | | 76 | 52 | 45 | 33 | 52 | 45 | 54 | |
| index: | 15 | 14 | 13 | 12 | 11 | 10 | 9 | 8 | 7 | 6 | 5 | 4 | 3 | 2 | 1 | 0 |

(d) Merge of $Seg^w(2)$ and $Seg^b(2) \Rightarrow Seg^w(3)$

FIG. 9

METHODS AND SYSTEMS FOR REAL-TIME 3D-SPACE SEARCH AND POINT-CLOUD PROCESSING

CROSS-REFERENCE TO RELATED APPLICATIONS

This application is a continuation-in-part of U.S. Pat. No. 10,580,114, issued Mar. 3, 2020, which claims the benefit of Provisional Application No. 62/478,422, filed Mar. 29, 2017.

TECHNICAL FIELD

The current application is directed to computational transformations, decompositions, searching, data sampling, and other operations that can achieve significant computational and thermodynamic efficiencies in many problem domains, including 3D-space search, k nearest neighbors, and point-cloud registration with an array based data repository.

BACKGROUND

A point cloud is a 3D data set collected by various sensors, such as light detection-and-ranging "LIDAR" sensors, depth cameras, and others. Point cloud registration iteratively aligns a new frame of a 3D data set with previous aligned frames, referred to as a "map." In many applications, a sensor moves in a 3D space with six degrees of freedom and each new frame relates to a previous frame or to a set of aligned previous frames by a spatial transformation. The registration of a sequence of frames of a 3D data set is a process that involves finding the rigid transformations, consisting of translations and rotations, that align the frames in a selected coordinate system.

Point cloud registration has a broad range of applications in areas including computer vision, simultaneous localization and mapping ("SLAM"), robot-path planning, autonomous driving, object recognition, medical imaging, magnetic-resonance imaging, virtual and augmented reality, and 3D model construction in remote sensing. Many new applications have become possible, in recent years, due to rapid advances in sensing and computing technologies, as a result of which 3D data-set registration is becoming an increasingly significant component within many scientific, technological, and commercial applications and fields.

Iterative Closest Point ("ICP") and Generalized Iterative Closest Point ("GICP") are widely adopted approaches for point-cloud registration. As suggested by its name, ICP depends on iterative searching of 3D spaces and, indeed, its performance is dominated by the cost of such searches. K-d trees and other tree-based approaches are used to search for closest points, and these tree-based approaches involve expensive tree traversals and re-balancing. Empirical testing has shown that it is unrealistic to perform real-time point cloud registration with any known tree-based approach to 3D space searching in order to meet a desired precision.

A point cloud frame is generally compressed by sampling to reduce its cardinality prior to frame alignment in order to decrease processing costs. To ensure that the compression does not result in significant decrease in accuracy, many compression techniques are designed to ensure that each 3D voxel contains only up to a threshold number of data points by removing data points from those 3D voxels with more than the threshold number of data points. Octree has been suggested and used for these compression techniques, which uses a storage space of a size proportional to the product of the ranges of the spatial coordinates in each of the three dimensions and which employs processing times proportional to the logarithm of the size of the octree for each point examined. The aligned point cloud frames, or map, produced by point-cloud registration is stored in a data repository. The data repository is incrementally built up along with the processing of each new frame, and, at the same time, is searched repeatedly for certain points in each frame.

As is well understood by those familiar with science and technology, the computational efficiency of a method or subsystem within a computer system, measured by the number of instructions processed and the amount of memory used to carry out particular tasks, is directly related to thermodynamic efficiency of the computer system, and is a significant real-word, physical characteristic of electromechanical computing systems. The time efficiency of a method or subsystem within a computer system is directly related to the real-world performance of the physical computer system and is often a significant determinant of the practical utility of the computer system in real-world applications. As with any significant component of an application, technology, or system, researchers, designers, developers, manufacturers, and vendors continuously seek more efficient and faster 3D-data-set-registration methods and systems, and seek improved efficiencies in many other, related applications and problem domains.

SUMMARY

The current document is directed to a dimensional shuffle transform ("DST") that maps a 3D space to a one-dimensional space with an implicit recursive hierarchical structure that preserves 3D neighborhoods. A regional or neighborhood search for points in a 3D subspace is reduced, by the DST, to one or more searches in the transformed 1D space. The search is performed by either recursive decomposition of the 3D space indexed by the transform into subspaces, exploiting the transformed space structure, or by direct indexing into the region of interest. This approach to searching a 3D space using the DST Transform has been shown, by both theoretical analysis and empirical testing, to be more time-efficient and space-efficient and to provide better performance in recall and precision than currently used approaches based on k-d trees, octal trees, and their many variants. Moreover, the searches over the subspaces generated by recursive decomposition are completely independent from one another, providing many opportunities for a variety of parallel, DST-enabled search methods. The DST provides a basis for fast and efficient iterative closest point search and compression of point clouds while avoiding construction and traversal of tree-like data structures. The performance of the system is further enhanced with the black-white array ("BWA"), disclosed in this document, which supports the search over the one dimensional space derived from DST transform without the need for pointer chasing and rebalancing of a tree structure, as found in tree-based solutions typified by the well-known red-black tree.

BRIEF DESCRIPTION OF THE DRAWINGS

FIG. 8 illustrates the layout and structure of a BWA, along with associated notions, including BWA segments and their ranks.

FIG. 9 illustrates the insert operation of a value into the BWA.

DETAILED DESCRIPTION

Computer Systems

Figure 1:
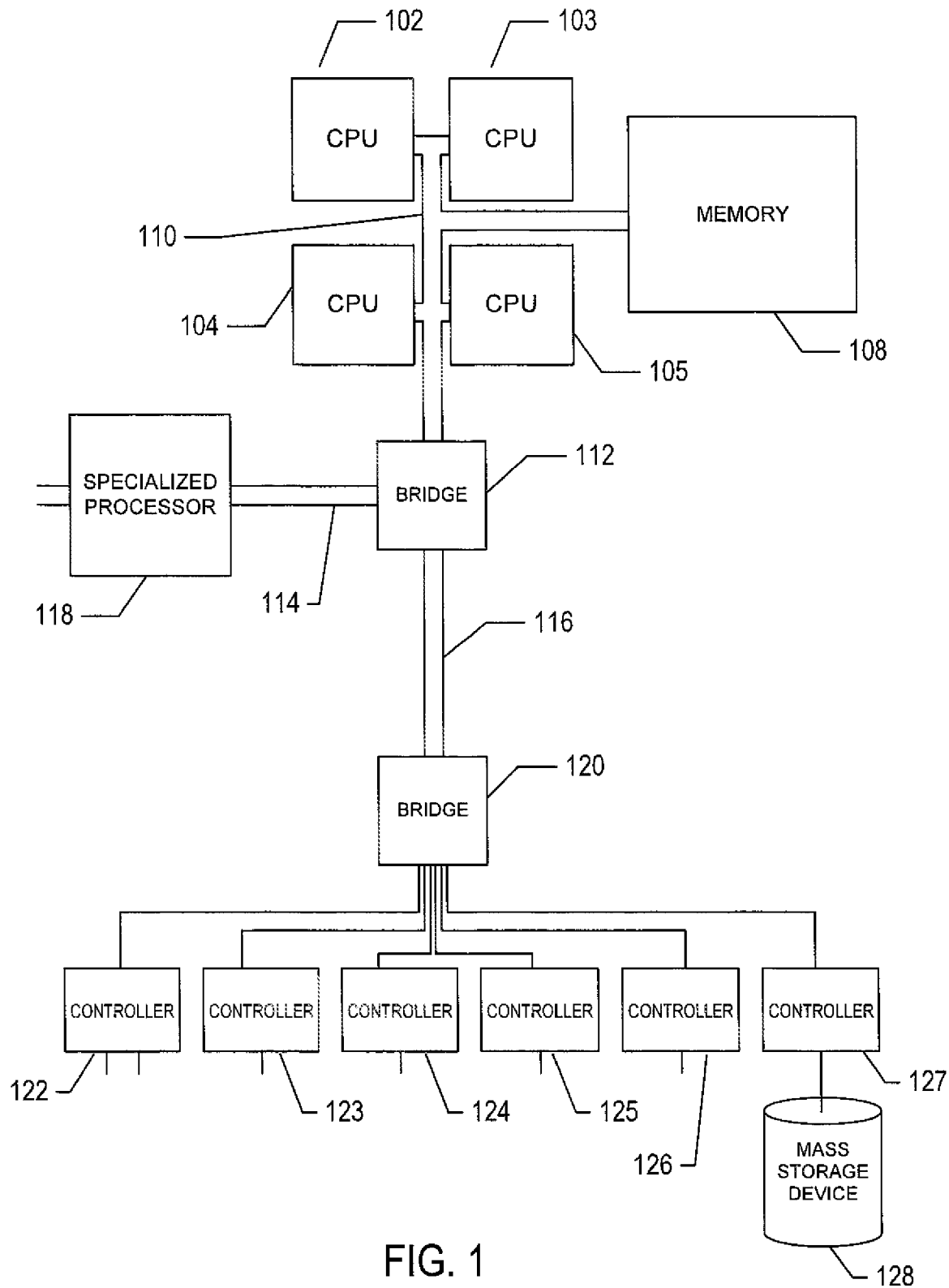
FIG. 1 provides a general architectural diagram for various types of computers.

FIG. 1 provides a general architectural diagram for various types of computers, including certain of the computer systems on which point-cloud-registration systems are implemented. The computer system contains one or multiple central processing units ("CPUs") 102-105, one or more electronic memories 108 interconnected with the CPUs by a CPU/memory-subsystem bus 110 or multiple buses, a first bridge 112 that interconnects the CPU/memory-subsystem bus 110 with additional buses 114 and 116, or other types of high-speed interconnection media, including multiple, high-speed serial interconnects. These buses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. Computer systems, and higher-level systems implemented using them, are physical electro-mechanical systems that consume energy and transform the physical states of many subcomponents and external systems to which they are connected. Computer systems are controlled by computer instructions stored in physical data-storage devices. The computer instructions are themselves physical entities. Otherwise, they could not be stored and retrieved from data-storage devices. Furthermore, mass-storage devices store data for subsequent retrieval and therefore do not encompass electromagnetic waves and other data-transmission media which are not devices and which do not store data for subsequent retrieval.

Notational Conventions and Primitive Objects and Operations

A point p in a discrete 3D space ($D^3$) can be represented by a tuple of three coordinates (z, y, x), where z, y, x are nonnegative integers and are each referred to as a coordinate of point p along their respective coordinate axis, Z, Y, or X, of the 3D space. A point in a 1D space is represented by a single nonnegative coordinate k along a single axis of the 1D space. The Euclidian metric for distance is assumed for the space unless otherwise specified, although certain of the following discussions may be valid for additional distance metrics, such as the Manhattan distance metric.

Let $p_1=(z_1, y_1, x_1)$ and $p_2=(z_2, y_2, x_2)$ be two points in $D^3$. These two points define a regular region, denoted by $<p_1, p_2>$, with a cubic shape:

$$<p_1, p_2>=\{p=(z, y, x) | \min(z_1,z_2) \le z \le \max(z_1,z_2);$$

$$\min(y_1,y_2) \le y \le \max(y_1,y_2);$$

$$\min(x_1,x_2) \le x \le \max(x_1,x_2)\}.$$

Note that when one, two, or three of the conditions $z_1 \ne z_2$, $y_1 \ne y_2$, and $x_1 \ne x_2$ is/are not met, the region R degenerates to a plane, a line, or a point respectively. A regular region r' is a sub-region of a region r if and only if, considering r' and r as sets:

$$r' \subset r.$$

The following are operations over binary numbers and integers:

B(x): returns the binary form $b=[b_{m-1}{}^x, \ldots b_0{}^x]$ of integer x, $B^{-1}(b)$: returns x if and only if B(x)=b, Get(x, j): returns the jth bit of B(x), Set(x, j, c): sets the jth bit of B(x) to the binary bit c and returns the corresponding integer.

The notations: || and && denote the logical OR and AND of predicates respectively, |, &, and ^ are used to denote, respectively, the bitwise OR, AND, and ExclusiveOR operations of two unsigned integers, while ~ denotes the bitwise complement of an unsigned integer; <<m and >>m denote respectively the left and right shift by m bit positions of an unsigned integer.

The DST Transform

The Dimensional Shuffle Transform ("DST") is a mapping from three-dimensional space $D^3$ to one-dimensional space $D^1$, as defined below:

```
def H (z, y, x, w)
  k = 0
  ptr = 1
  for i = 0 to w-1
    dx = x & ptr
    x = x >> 1
    dy = (y & ptr) << 1
    y = y >> 1
    dz = (z & ptr) << 2
    z = z >> 1
    ktemp = dz | dy | dx
    ktemp = ktemp << (i * 3)
    k = k | ktemp
  end
  return k
end.
``` where w is the width, in bits, of a 3D coordinate along a 3D dimension. Given a point p in $D^3$, the DST Transform of the point, k=H(p), is referred to as the DST key of the point p.

Figure 2:
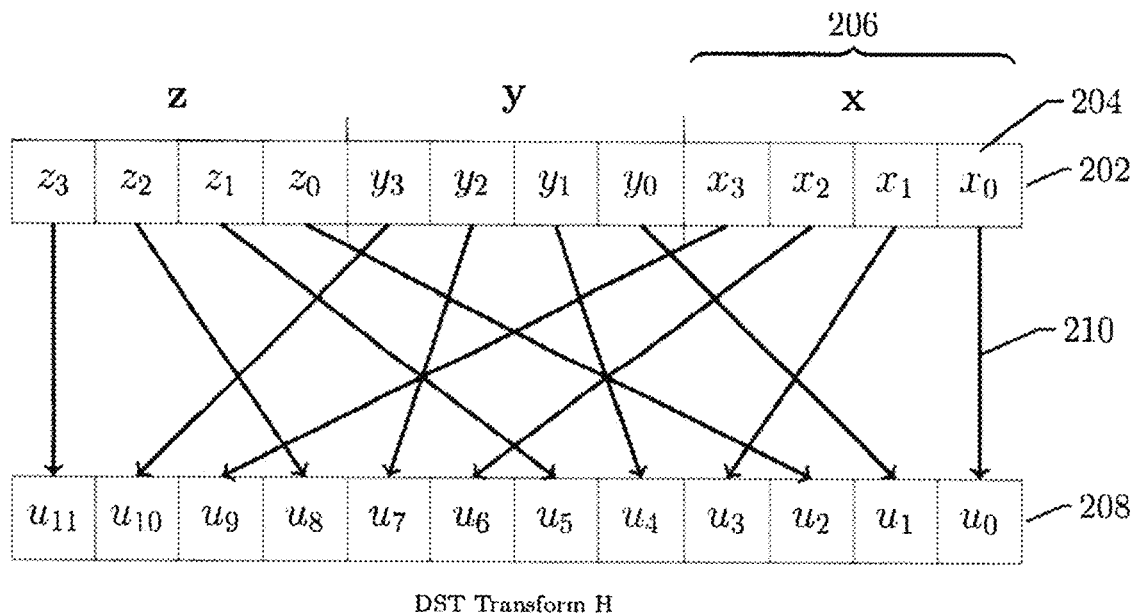
FIG. 2 illustrates the DST Transform H which maps 3D points to their DST keys in a 1D space.

FIG. 2 illustrates the DST Transform for a 3D space of the size of 4096. As shown in FIG. 2, the 3D coordinates for a point p in this space are each encoded in a 4-bit nibble within a 12-bit array of bits 202. The bits that represent each coordinate are arranged in right-to-left order of significance, with the least significant bit of a coordinate representation located at the right-hand end of the nibble. For example, the least-significant bit 204 of the nibble representing the x coordinate 206 is the rightmost bit of the nibble. The DST Transform splays out the bits of the 3D coordinates across a 12-bit representation 208 of the linear coordinate k, as indicated by arrows, such as arrow 210, in FIG. 2. The 12-bit representation 208 of the linear coordinate k can be thought of as a sequence of four three-bit blocks, each three-bit block containing an ordered triple of bits of a particular significance extracted from the corresponding 3D coordinates. The volume of the 3D space includes a number of points equal to the cube of the number of different coordinate values that can be represented by the number of bits used to represent a 3D coordinate. In the example shown in FIG. 2, each nibble can represent 16 different values, and thus the 3D space contains $16^3$=4096 points. The number of points in the one-dimensional transform space is equal to the number of k-coordinate values that can be represented by the number of bits used to represent a 1D coordinate. In the example shown in FIG. 2, 12 bits can represent $2^{12}$=4096 points. As the value v of a coordinate increases, the position of the leftmost 1-valued bit increases in stepwise fashion proportionally to the base-2 logarithm of v. For this reason, splaying 3D-coordinate bits across the k-coordinate representation tends to generate larger values for the k coordinate as the values of the 3D coordinates increase, since larger-valued 3D-coordinates have 1-values bits positioned further towards the left side of the nibble representing the 3D coordinates, which end up positioned even further towards the left side of the DST key k-representation by the DST Transform. The DST Transform H is clearly a bijection, and, as such, the inverse DST transform $H^{-1}$ exists, as follows:

```
def H⁻¹ (k, w)
  ptr = 1
  ptr2 = 1
  x = y = z = 0
  for i = 0 to (w−1)
    if (k & ptr) x = x | ptr2
    ptr = ptr << 1
    if (k & ptr) y = y | ptr2
    ptr = ptr << 1
    if (k & ptr) z = z | ptr2
    ptr = ptr << 1
    ptr2 = ptr2 << 1
  end
  return (z, y, x)
end
```

The result returned is a tuple of the 3D coordinates in the form of (z,y,x).

Figure 3:
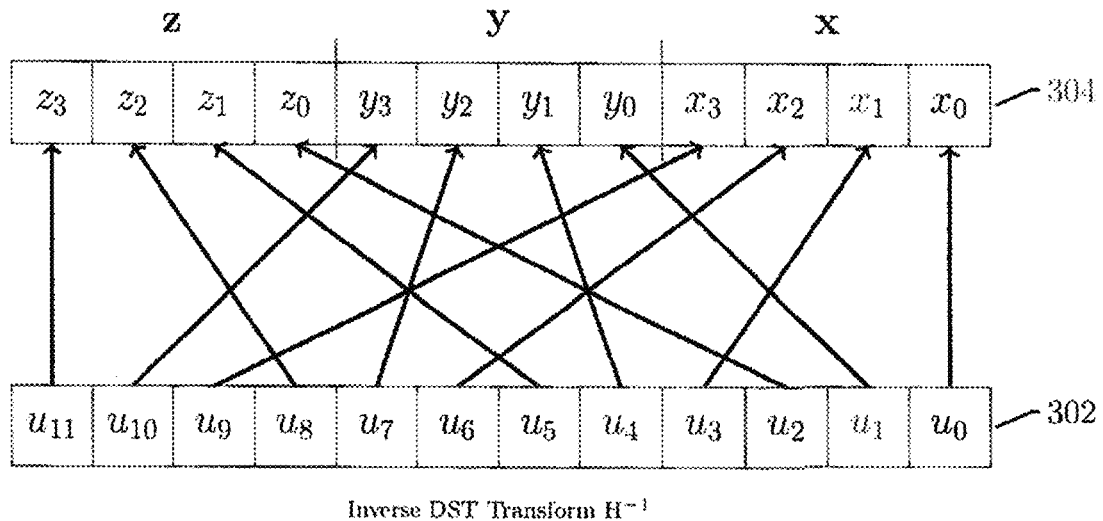
FIG. 3 illustrates the inverse DST Transform $H^{-1}$ using the same illustration conventions previously used in FIG. 1.

FIG. 3 illustrates the Inverse DST Transform $H^{-1}$ using the same illustration conventions previously used in FIG. 2. As shown in FIG. 3, bits of the 3D coordinates distributed across the 12-bit representation 302 of the DST key k are collected back into their respective coordinate-representing nibbles in the 4-bit-nibble representation of the concatenated 3D coordinates 304. Clearly, the inverse DST Transform $H^{-1}$ performs a transformation opposite from that performed by the forward DST Transform H, since the only difference between the illustrations shown in FIGS. 2 and 3 is the directions of the arrows representing the corresponding locations of the bits in the linear coordinate k and the bits in the 3D coordinates.

The DST Transform has the property of preserving neighborhoods in that points close to one another in the 3D space tend to be close to one another in the transformed space. Another way of looking at DST Transform is that the DST Transform imposes an implicit hierarchical recursive structure over the 3D space, where the original space, which can be considered to be the root cube with edges of length 2a, is conceptually divided into eight sub-cubes with edges of length a. The division can be recursively performed on the sub-cubes and their sub-cubes until the sub-cubes degenerate to a point, where the number of points along each sub-cube edge is one. The assertion that DST is a neighborhood preserving transform can then be formally justified by the fact that the DST keys of the all the points in a cube or sub-cube in this hierarchical structure always form a linear set of keys with monotonically increasing consecutive values [s,t]={k|s≥k≥t}. for two integer keys s and t, which will be referred to as the lower front and upper back corner of the cube or sub-cube, respectively.

Figure 4:
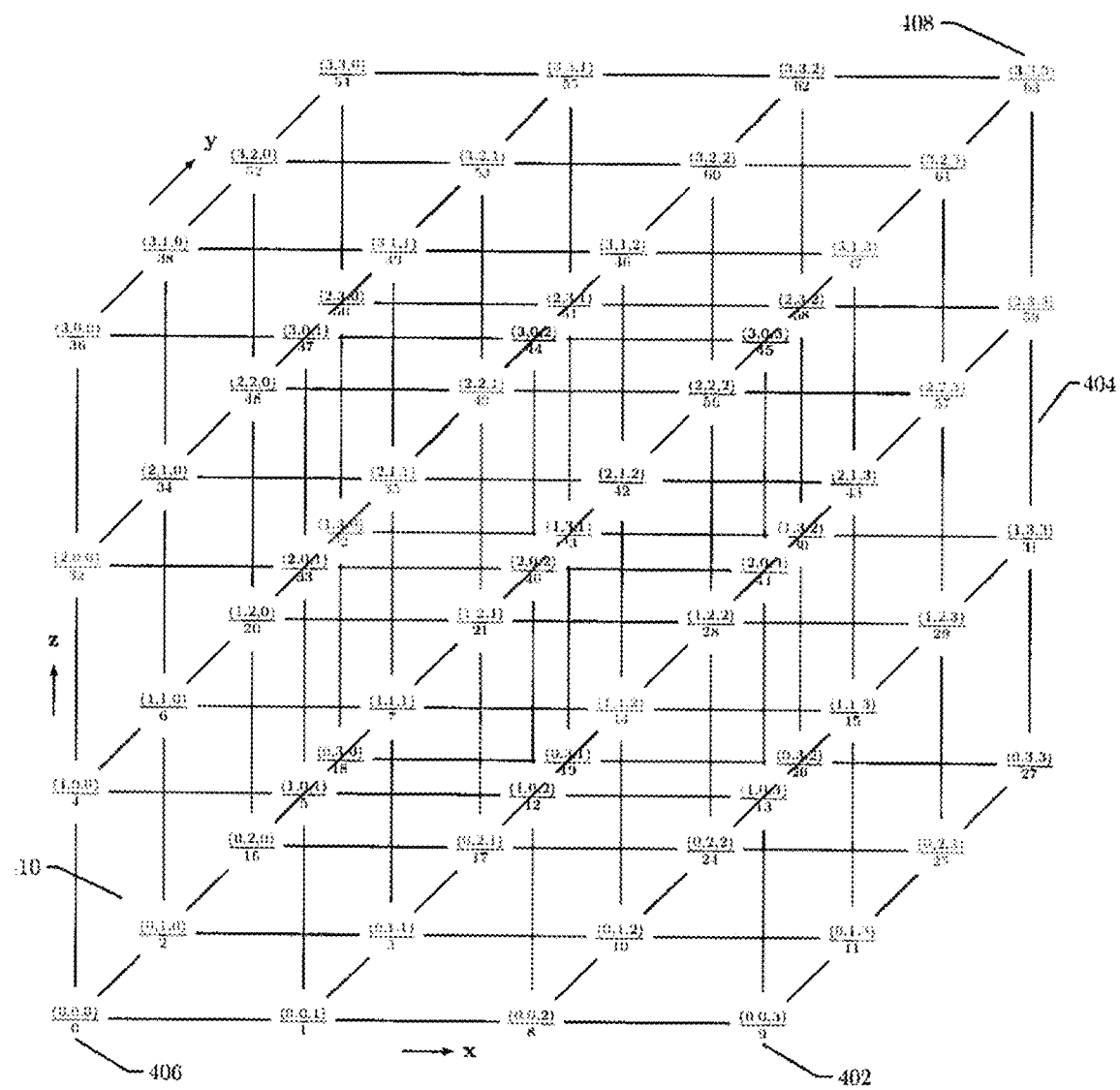
FIG. 4 illustrates the DST mapping of 64 points in a 3D space, their 3D coordinates and the corresponding keys in the 1D DST key space.

FIG. 4 illustrates a DST mapping between 64 points in a 3D space and their corresponding DST keys. Each point, such as point 402, is labeled with the point's 3D (z, y, x) coordinates and with the point's corresponding DST-transform-space k coordinate, or key, shown in FIG. 4 as $$\frac{(z, y, x)}{k}.$$

The overall cubic space 404 shown in FIG. 4 includes all the points with 3D coordinates that can each be represented using two bits. The entire space is contained within the cube having the lower, left-hand corner point 406 with 3D/1D coordinates (0, 0, 0)/0 and an upper, right-hand corner point 408 with 3D/1D coordinates (3, 3, 3)/63. There are other, smaller cubes, for which the DST keys of the points form a monotonically increasing subset of the set of DST keys, such as the small lower left corner cube 410 with points having the 3D coordinates (0, 0, 0), (0, 0, 1), (0, 1, 0), (0, 1, 1), (1, 0, 0), (1, 0, 1), (1, 1, 0), (1, 1, 1) and corresponding DST keys 0, 1, 2, 3, 4, 5, 6, and 7. Were the space to include all the points with 3D coordinates that can each be represented using three bits, the cube representing the space would include 512 points and were the space to include all the points with 3D coordinates that can each be represented using four bits, the cube representing the space would include 4096 points.

Regions and Their Properties

Given two keys $k_1$ and $k_2$, the regular region defined by the two keys, denoted by $<k_1, k_2>$, is given by {(z, y, x)|min($x_1$, $x_2$)≤x≤max($x_1$, $x_2$), min($y_1$, $y_2$)≤y≤max($y_1$, $y_2$), min($z_1$, $z_2$) max($z_1$, $z_2$)}, where ($z_1$, $y_1$, $x_1$)=$H^{-1}$($k_1$), ($z_2$, $y_2$, $x_2$)=$H^{-1}$($k_2$). A pair of keys $k_1$=H($z_1$, $y_1$, $x_1$), and $k_2$=H($z_2$, $y_2$, $x_2$) is said to be canonical if $x_1$≤$x_2$, $y_1$≤$y_2$, and $z_1$≤$z_2$ hold at the same time. With canonical pairs of keys, the definition of a regular region can be simplified as $<k_1, k_2>$={(z, y, x)|$x_1$≤x≤$x_2$, $y_1$, ≤y≤$y_2$, $z_1$≤$z_2$}. It is apparent that any pair of keys can be easily converted into a canonical pair of keys which defines exactly the same regular region. Hence, without loss of generality, we will use only canonical pairs to define a region.

The linear region defined by the two keys, denoted by [$k_1$,$k_2$], is given by {(z, y, x)|$k_1$≤H(z, y, x)≤$k_2$}. It can be easily shown that $<k_1, k_2>$⊆[$k_1$, $k_2$] always holds. Hence, a linear region [$k_1$, $k_2$] always has a recall of 100% when used to approximate a regular region$<k_1, k_2>$, for every point in the latter is necessarily contained in the set of the former.

The precision of a region defined by two keys ($k_1$, $k_2$) is given by Prec($k_1$, $k_2$)=|$<k_1, k_2>$|/|[$k_1$, $k_2$]|, where |S| denotes the cardinality of a set S. It follows that the precision of a region is always less than or equal to one. A region with precision one is a perfect region and a region with precision one and with the lengths of each edge along all dimensions equal to one another is referred to as a perfect cube.

The DST level is a fundamental characteristic of a region, which among other applications, is used in determining dividing planes during region-decomposition operations. The level of region defined by two keys $k_1$, $k_2$ is calculated by the method "Lvl," as follows:

```
def Lvl (k₁, k₂, w)
  k = k₁ ^ k₂
  level = w - 1
  window = 7 << (3 * (w - 1) )
  while ((window & k) = = 0 && level >=0)
    window >> 3
    level = level - 1
  end
  return level
end
```

Given two keys $k_1$ and $k_2$, $Lvl(k_1, k_2)$ calculates the level of the regular region $<k_1, k_2>$. In the code shown above, w is the width of each 3D coordinate's binary form, in bits. The routine Lvl examines the binary bits in $k=k_1$ XOR $k_2$ in successive blocks of three bits from left to right, and then finds the index of the three-bit block containing the left-most 1-valued bit or bits in k, which represent the most significant bit or bits of the 3D coordinates corresponding to the keys $k_1$ and $k_2$ that differ.

A non-perfect region with a volume greater than the smallest possible volume of a region can always be decomposed into sub-regions with better, if not perfect, precisions. The decomposition is done in a way that maximizes the precision. The following method Pat is an auxiliary method used in the determination of an optimal decomposition:

```
def Pat(k₁, k₂, L)
  k = k₁ ^ k₂
  pat = 7
  pat = pat << 3*L
  pat = pat & k
  return pat >> 3*L
end
```

Given two keys $k_1$ and $k_2$ and a pre-calculated level of $<k_1, k_2>$, $Pat(k_1, k_2)$ calculates the pattern of the defined region, subsequently used in the decomposition of the region. The pattern is necessarily an integer with an integer value in the range 1, . . . , 7. The pattern, in its binary form $(b_2, b_2, b_1)$, indicates the dividing axes in a decomposition. When there is only one non-zero bit in the pattern, the region is decomposed by dividing the region by a plane perpendicular to the axis corresponding to the position of the bit in the pattern. When there are two non-zero bits, the region is decomposed by two planes perpendicular to the corresponding axes indicated by the pattern. When there are three non-zero bits, the region is decomposed by dividing the region by three mutually perpendicular planes.

Figure 5:
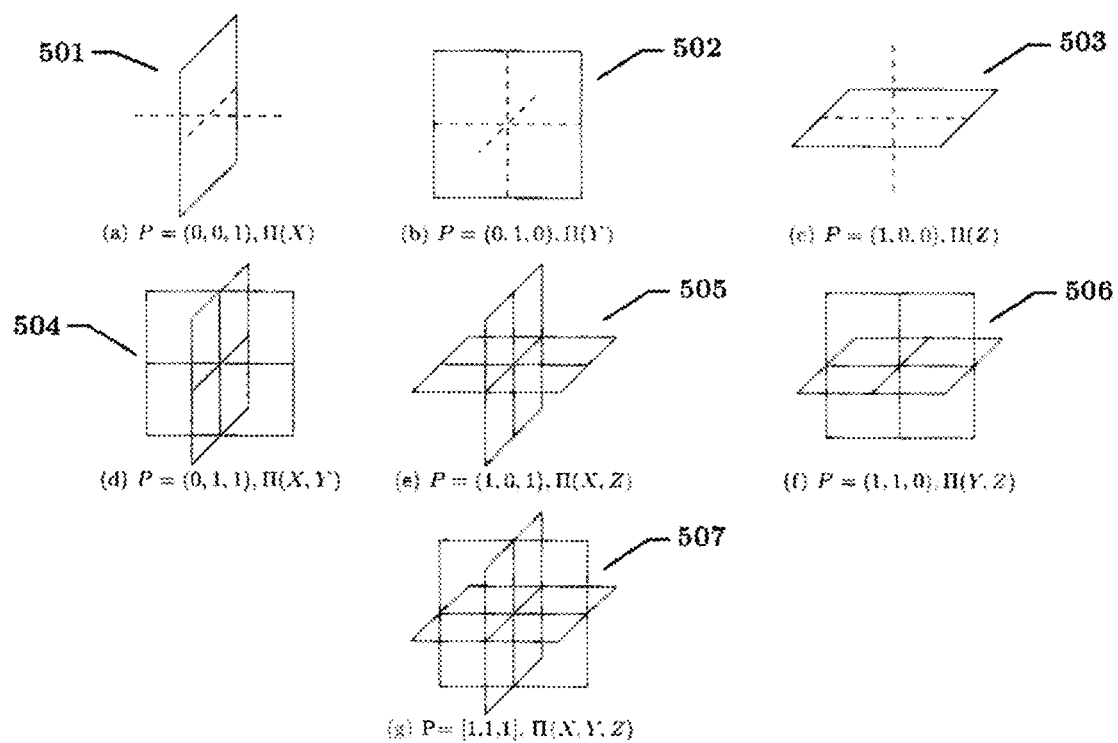
FIG. 5 illustrates the seven different partitions of a region according to its pattern calculated by the method Pat, which leads to optimal decomposition of the searched region.

FIG. 5 illustrates seven different region decompositions according to the different patterns calculated by the method Pat. The pattern 001 (501) indicates division by a plane perpendicular to the X axis, or alternatively, we say that the division is along the X axis. Similarly, a pattern 010 (502) calls for a division by Y axis, and the pattern 100 (503) indicates a division along the Z axis. On the other hand, the pattern 011 (504) indicates a division along both the X and Y axes. The pattern 101 (505) indicates division along X and Z axes and the pattern 110 (506) indicates division along Y and Z axes. The pattern 111 (507) indicates division by three mutually perpendicular planes, and hence dividing the region along each of the three axes. Of the seven decompositions, three are binary, three are quaternary, and one is octonary.

Region Decomposition

Two auxiliary methods are used to identify the corners of the perfect region in which a point resides, given a particular level. Given the key of a point and a level, the following method LowerFt calculates the lower front corner of the perfect cube at the given level to which the point belongs. The method LowerFt sets each of the least significant 3*L bits of the key to the bit value 0.

```
def LowerFt(k, L)
  ptr = 1 << 3*L
  rightOnes = ptr - 1
  rightZeros = ~ rightOnes
  return (k & rightZeros)
end
```

Given the key of a point and a level, the method UpperBk calculates the upper back corner of the perfect cube at the given level to which the point belongs:

```
def UpperBk(k, L)
  ptr = 1 << 3*L
  rightOnes = ptr - 1
  return (k | rightOnes)
end
```

Given three keys $k_1$, $k_2$, and $k_3$, the following utility method C returns the concatenated 3D coordinates of a point that has the same x coordinate as the 3D point corresponding to $k_1$, the same y coordinate as the 3D point corresponding to $k_2$, and the same z coordinate as the 3D point corresponding to $k_3$, using predefined bit masks XMask=(001001 . . . 001), YMask=(010010 . . . 010), and ZMask=(100100 . . . 100):

```
def C(k₁,k₂,k₃)
  x = XMask & k₁
  y = YMask & k₂
  z = ZMask & k₃
  k = (x | y | z)
  return k
end
```

An m-ary decomposition for a given pattern P is written as $\Pi^P(k_1, k_2) = ((k_1^0, k_1^1), \ldots, (k_{m-1}^0, k_{m-1}^1))$. The m subregions are each specified by a pair of canonical keys. It follows that besides $k_1$ and $k_2$, 2m−2 keys need to be calculated. It turns out that all the 2m−2 keys can be efficiently derived from $k_1$, $k_2$, $u=upperBk(k_1,L)$, and $v=lowerBk(k_2, L)$, where $L=Lvl (k_1, k_2, w)$.

For example, the three methods, with names $\Pi^1$, $\Pi^2$, and $\Pi^4$, where the superscript 1 represents the binary pattern 001, the superscript 2 represents the binary pattern 010, and the superscript 4 represents the binary pattern 100, carry out a binary decomposition of a region $<k_1, k_2>$ of given level L. The method $\Pi^1$ is next provided:

```
def Π¹(k₁, k₂, L)
  k_u = UpperBk (k₁, L - 1)
  k_v = LowerFt (k₂, L - 1)
```

-continued

```
    k₃ = C(kᵤ, k₂, k₂)
    k₄ = C(kᵥ, k₁, k₁)
    return ((k₁, k₃),(k₄, k₂))
end
```

The above method performs a binary decomposition of a region along the X axis. Similarly constructed methods $\Pi^2$ and $\Pi^4$ perform binary decompositions along the Y and Z axes, respectively.

The method $\Pi^3$ carries out a quaternary decomposition of a region $<k_1, k_2>$ in accordance with pattern 011 (504 in FIG. 5) along both the X and Y axes. This method is preformed as follows:

```
def Π³ (k₁, k₂, L)
    kᵤ = UpperBk (k₁, L − 1)
    kᵥ = LowerFt (k₂, L − 1)
    k₁₂ = C(kᵤ, kᵤ, k₂)
    k₂₁ = C(kᵥ, k₁, k₁)
    k₂₂ = C(k₂, kᵤ, k₂)
    k₃₁ = C(k₁, kᵥ, k₁)
    k₃₂ = C(kᵤ, k₂, k₂)
    k₄₁ = C(kᵥ, kᵥ, k₁)
    return ((k₁, k₁₂), (k₂₁, k₂₂), (k₃₁, k₃₂), (k₄₁, k₂))
end
```

Methods $\Pi^5$ and $\Pi^6$ are similarly constructed. Method $\Pi^7$ performs an octonary decomposition along all axes for the pattern 111 (507 in FIG. 5):

```
def Π⁷(k₁, k₂, L)
    ku = UpperBk (k₁, L − 1)
    kv = LowerFt (k₂, L − 1)
    k₂₁ = C(kᵥ, k₁, k₁)
    k₂₂ = C(k₂, kᵤ, kᵤ)
    k₃₁ = C(k₁, kᵥ, k₁)
    k₃₂ = C(kᵤ, k₂, kᵤ)
    k₄₁ = C(kᵥ, kᵥ, k₁)
    k₄₂ = C(k₂, k₂, kᵥ)
    k₅₁ = C(k₁, k₁, kᵥ)
    k₅₂ = C(kᵤ, kᵤ, k₂)
    k₆₁ = C(kᵥ, k₁, kᵥ)
    k₆₂ = C(k₂, kᵤ, k₂)
    k₇₁ = C(k₁, kᵥ, kᵥ)
    k₇₂ = C(kᵤ, k₂, k₂)
    return
        ((k₁, ku),(k₂₁, k₂₂),(k₃₁, k₃₂),(k₄₁, k₄₂),
         (k₅₁, k₅₂),(k₆₁, k₆₂),(k₇₁, k₇₂,(kᵥ, k₂))
end
```

Given a region R that is a non-perfect region defined by two keys $k_1$ and $k_2$, with an m-ary pattern, let the m sub-regions $(k_{11}, k_{12}), \ldots, (k_{m1}, k_{m2})$ be produced by decomposition of the region according to the pattern be $(k_{11}, k_{12}), \ldots, (k_{m1}, k_{m2})$, and $$s_1 = k_2 - k_1 + 1, \text{ and}$$

$$s_2 = \sum_{i=1}^{m} (k_i^2 - k_i^1 + 1),$$

then it is easy to show that $s_2 < s_1$ always holds. It follows that the precision of a non-perfect region is always improved after a DST decomposition. Moreover, DST decompositions have the following properties: (1) any largest perfect region contained in the region is always contained in a sub-region in the result as a whole and will never be partitioned; and (2) there are no other decompositions of the same arity (m) with an overall linear size smaller than $s_2$. In this sense, the DST decompositions according to the corresponding patterns are optimal.

Regional Search

The decomposition of a region $<k_1,k_2>$, is performed by the following method, which first identifies the pattern of the region and then calls the corresponding decomposition method:

```
def Π(k₁, k₂)
    L = Lvl(k₁, k₂)
    P = Ptn(k₁, k₂)
    case P of
        1: d = Π¹(k₁, k₂, L)
        2: d = Π²(k₁, k₂, L)
        3: d = Π³(k₁, k₂, L)
        4: d = Π⁴(k₁, k₂, L)
        5: d = Π⁵(k₁, k₂, L)
        6: d = Π⁶(k₁, k₂, L)
        7: d = Π⁷(k₁, k₂, L)
    end
    return d
end
```

Given that $<s, t>$ is an non-perfect region, and $\rho$, a number between 0 and 1, is the desired precision, the following method recursively decomposes the region into sub-regions with precision equal or higher than $\rho$:

```
def Πᴿ (s, t, ρ)
    Task = ( )
    Results = ( )
    Decs = ( )
    push (Task, (s, t))
    while (NotEmpty(Task))
        (k₁, k₂) = pop (Task)
        if (Precision (k₁, k₂) ≥ ρ)
            push (Result, (k₁,k₂))
        else
            Decs = Π(k₁, k₂)
            while (NotEmpty (Decs))
                push (Task, pop( Decs ))
            end
        end
    end
    return Result
end
```

The search of a region in 3D space is therefore a recursive process. A subregion is further decomposed if and only if its precision has not reached the predefined value. The result of the above search is a list of linear regions with precisions equal or higher than the given value of $\rho$.

There are other ways to control the recursion. One of them depends on the notion of geometric level. Given a regular region $<s, t>$, and its longest edge along all dimensions l, the regular region has a geometric level of $\lceil \log_2(l) \rceil$. It is easy to verify that the geometric and DST levels are equal for a perfect cube at any level, and the former is always smaller than or equal to the latter for any region. The difference between the two levels of a region is thus an indicator to how close the region is to a perfect cube, and as such it can be used to replace the precision $\rho$ in method $\Pi^R$ for better computing efficiency.

No matter how the value of precision or level difference is chosen, method $\Pi^R$ always yields a result with 100% recall. The freedom of setting different stopping thresholds for the recursive divide-and-conquer process allows a tradeoff between the precision and computing speed, which can be easily exploited for performance optimization.

The result of the search by FIR in the above is a list of disjoint linear subregions with desired precision. The search over a 3D region is thus reduced to the searches over several 1D intervals of the linearly ordered DST key spaces.

Given that $S=\{p=\{x,y,z\}|0\le x\le X; 0\le y\le Y; 0\le z\le Z; X, Y, Z$ Integers$\}$ be a regular 3D space with the length along each dimension equal to X, Y, Z, respectively, and a set of Points of Interest ("POIs") distributed over the space S, a regional search with respect to the regular region $R=<s, t>$ in S finds each point p s.t. $p\in POI$ and $p\in R$. It is apparent that the DST key of any point of interest p in the searched region R necessarily falls into one and only one of the linear regions in the list of results returned by method $\Pi^R$. The 3D region search thus reduces to a search over a number of intervals corresponding to the linear regions in the Result returned by $\Pi^R$.

In the above program for $\Pi^R$, when a linear region meets the precision criterion, it is pushed into the Result, and the Result with all the linear regions is returned as a whole by the recursive decomposition. The search for the points of interests in the linear regions is performed as a separate procedure. Alternatively, when a linear region $[k_1, k_2]$ meets the precision criterion, instead of pushing it into the result list, a search can be immediately started for the DST keys with values falling in the interval $[k_1, k_2]$ using a data repository ("Repo") that supports some operations. The operations include Put (Repo, k), which allows DST keys to be inserted in the Repo dynamically, and Get (Repo, u, v), which finds keys in the Repo with values falling between u and v.

There are a variety of data structures which can be adapted to serve purpose, including the well-known sorted list and Red-Black Tree. As will be seen in the following section, a new type of Repo named Black-White Array ("BWA") is provided as a faster solution to the problem. Unlike any tree-based or list-based approach, a BWA uses arrays as the underlying structure, and thus avoids storing, de-referencing and maintaining pointers and rebalancing the structure.

Since the linear regions by the decomposition with method $\Pi^R$ are disjoint, the searches over the regions are completely independent of each other, and therefore can be done in parallel. Moreover, the recursive decomposition process can be done in parallel with the search over any so far discovered regions to afford another level of parallelism provided that the computing resources are available.

Neighborhood Examination

Figure 6:
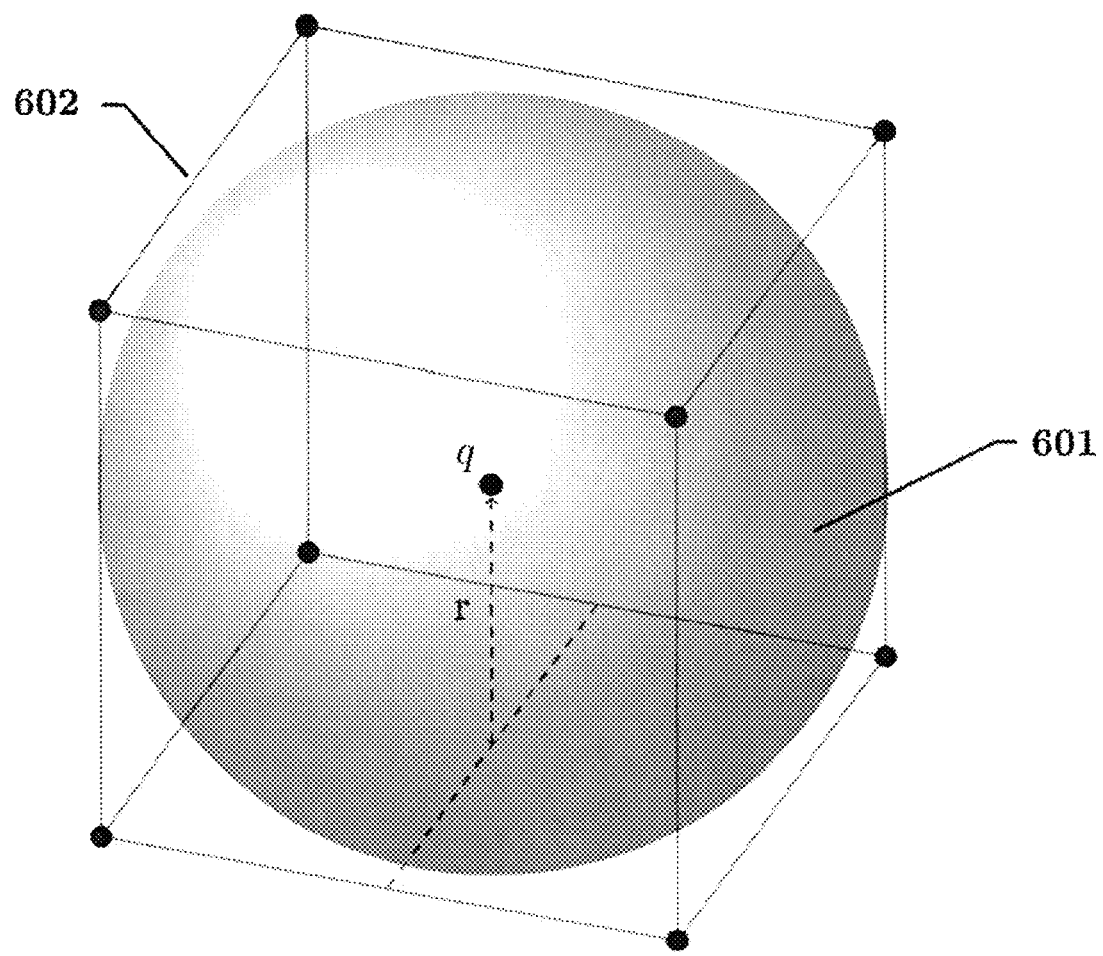
FIG. 6 shows a spherical neighborhood R with radius r circumscribed within a cube with edge length 2r.

FIG. 6 shows a spherical neighborhood R with radius r (601) circumscribed within a cube with edge length of 2r (602). Given that $S=(p_{n-1}, \ldots, p_0)$ is a set of points in a 3D space, the spherical neighborhood, with radius r, of reference point $q=(z_q, y_q, x_q)$ is the set:

$Nbr_s(S, q, r)=\{p|p\in S, Dist(p, q)\le r\}$.

On the other hand, the cubical neighborhood of reference point q (602) in the same space refers to:

$Nbr_c(S, q, r)\{p|p=(z_p, y_p, X_p)\in S, |z_p-z_q|\le r, |y_p-y_q|\le r, |x_p-x_q|\le r\}$.

Let R be a region in a space, U the set of points of interests in R, and V a set of points returned by a search, then the recall of the search is given by recall=$|U\cap V|/|U|$ while the precision of the search is given by precision=$|U\cap V|/|V|$ The two metrics are used to measure the performance of a search in terms its completeness and preciseness respectively. Their values are always a number between 0 and 1, by definition. Note that the notion of precision of a region previously introduced is related to but different from precision of a search.

A neighborhood examination over the 3D data set S starts with the DST Transform H that maps each point p in S to a point in an one-dimensional space and puts the ensemble in a data repository Repo, which supports two operations: Put (Repo, k) and Get (Repo, s, t), as stated previously. The method $\Phi$ maps a set of points using the transform H and puts the results into a Repo, where w is the width of the binary form for the coordinates along each dimension of the 3D space:

```
def Φ(S, w)
    Repo = ( )
    for each p in S
        Put (Repo, H (p, w))
    end
    return Repo
end
```

The following method NBR computes the neighborhood $Nbr_c(S, q, r)$, with a recall of one and a precision $\rho$ between 0 and 1, that a user can choose properly according to the circumstances of the application, with the operation Put (Repo, k) storing the point p with the key k=H(p) in the Repo while the operation Get(Repo, s, t) retrieves all the points with keys in the closed intervals of [s, t]:

```
def NBR(S, q, r, ρ, w, cubic?)
    Result = ( )
    Repo = Φ (S, w)
    ST = ΠR(H(z-r,y-r, x-r), H(z+r, y+r, x+r), p)
    for each (s, t) in ST
        K = Get (Repo, s, t)
        for each k in K
            p = H-1 (k, w)
            if (cubic?)
                push (Result, p)
            else
                if (Dist (p, q) ≤ r)
                    push (Result, p)
                end
            end
        end
    end
    return Result
end
```

In the above method, $S=\{p_{n-1}, \ldots, p_0\}$ is a set of points of interest in a 3D space, q=(z,y,x) is the reference point, r is the radius of the neighborhood, $\rho$ is the specified precision. The argument cubic? is a Boolean argument that indicates whether the neighborhood to be searched is cubic or spherical.

Both cubic and spherical neighborhood examination has a recall of 100%. In other words, any point in the region will turn out in the result. The precision of the cubic neighborhood can be controlled by the parameter $\rho$, which can take any desired value between 0 and 1. A spherical neighborhood can be approximated by the circumscribing cubic neighborhood, if so desired, which yields an expected precision of 52.3598%, assuming uniform distribution of the points in the space. For searches with precision smaller than one, the points falling out the cubic or spherical region can be easily removed from the final result by a filtering process, which simply checks if the points falls within the region. Hence the precision can always be made 100% with a filtering process that takes time linear with the number of points in the search result, even when the search is given a low precision parameter. In general, a search with a reasonably low precision parameter followed by a filtering process is much more efficient than a search with a precision parameter equal to 1 to achieve 100% of precision.

In many problems, it is often desired to find the k nearest neighbors for a given point, particularly for the case k=1. The method Nbrk uses method NBR_c to determine the nearest k neighbors for a given point q in the space S:

```
def Nbr_k (S, q, r, ρ, w, cubic?)
    Result = Nbr_c(S, q, r, ρ, w, True)
    sort Result
    return (Result, 0, k−1)
end
```

For a small neighborhood, Result is generally a small set, hence the cost of sorting is generally low. An alternative to insert the points in the result into a separate Black-White array, which is always segment-wise sorted, as provided in the following section.

Figure 7:
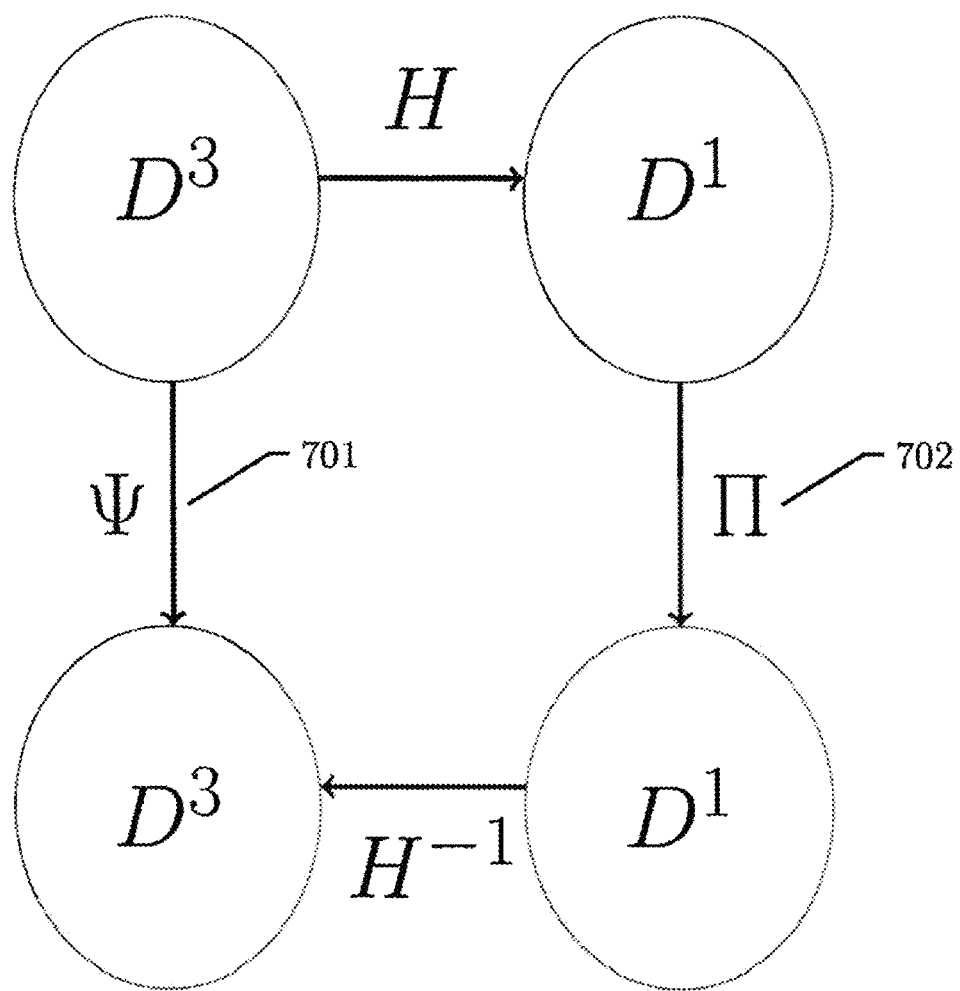
FIG. 7 illustrates the difference and relationship between two approaches to solving 3D-space search problem.

Neighborhood examination in 3D space has been mostly performed directly over the space, using methods, denoted Ψ, that are often based on k-d trees. The current methods differ from the conventional approaches in that it uses a transform, written H, to reduce the problem into a problem in the domain of one-dimensional space with special properties. The neighborhood examination is then performed in the transformed domain with the Π method. The results are then transformed back to 3D domain with $H^{-1}$, the inverse of Φ. In functional notation, the methods in this embodiment can be concisely summarized as $\Psi = H^{-1} \cdot \Pi \cdot H$. FIG. 7 provides an illustration of the current H-and-$H^{-1}$-transform based approach (702), and the direct methods denoted by Ψ (701).

Finally, a very fast search method for the nearest neighbor or neighbors of a point by searching the perfect cube of a certain level to which point p resides is provided:

```
def Nbr_cube(p, L_c)
    k = DST (p)
    s = LowerFront (k, L_c)
    t = UpperBack(k, L_c)
    neighbors = Get (Repo, s, t)
end
```

Assuming the DST level of the perfect cube calculated from a desired diameter is $L_c$, this method ensures that all points within the perfect cube of level $L_c$ to which point p belongs are searched. While the search within the perfect cube has 100% recall, some points which might be closer to the point p than those in the result might not be included. This occurs when the point p resides near the edges or corners of the cube. The impact of this inaccuracy to the precision of the final map of a point cloud is often practically undetectable.

Point Cloud Sampling

The purpose of point cloud sampling is to reduce the cardinality of the data set. This procedure is generally applied to every new frame of data, such as point cloud collected by LiDar, to reduce the cost of computation. Existing methods include: (1) removing every k-th point from the input with respect to some ordering of the data points; and (2) using an octree to filter out all but one point in each octree cell.

The space can be scaled to keep zero or one point in every perfect cube of level $L_s$ in the DST-transformed space. The following point-cloud-sampling method carries out this compression:

```
def Samp (p, Lc)
    k = DST (p)
    s = LowerFront (k, L_c)
    t = UpperBack(k, L_c)
    if (!Get (Repo, s, t))
        push (Repo, k)
    return
end
```

The sub-region defined by keys s and t is always a perfect cube; therefore, this procedure never involves region decomposition. In effect, in functionality, this is equivalent to the sampling by octree. The difference is that the above method uses neither the explicit construction of an octree nor any tree traversals. Even though developed for difference purposes, the above two methods share the basic approach of searching in a perfect cube of a certain level.

Note that a point cloud with negative and/or decimal coordinates can always be shifted and scaled so that all coordinates are positive and integral prior to applying the currently disclosed methods.

The point-cloud search and sampling methods, discussed above, provides order(s) of magnitude improvement in the computational efficiency of point-cloud-registration systems. As discussed above, this represents an enormous improvement in these types of computing systems, both from the standpoint of energy consumption, memory-resource consumption, and real-time performance, moving point-cloud registration from the prototype and research realms into the realm of practical, commercially feasible systems underlying point cloud registration, simultaneous localization and mapping (SLAM), autonomous vehicles and other such real-world applications. The DTS transform, along with the decomposition methods discussed above, can be usefully applied in many problem domains, just as Fourier transforms are used throughout science and technology, from image and signal processing to quantum mechanics and molecular-structure determination.

Black-White Array

In this embodiment, the values in a data repository ("Repo") are assumed to be drawn from a totally ordered set, e.g. the set of integers and/or DST keys. Note that DST keys are positive integers in an 1D space even though they are derived from the coordinates of the points in a 3D space. The operations supported here are (1) Insert v: inserts a value into the Repo; (2) Search v: finding the location inside Repo where the value equal to v, if v exists in the Repo, otherwise return nil; (3) Find (u, v): finds all the values in the Repo that fall in the close interval of [u, v]. The Find operation is motivated by applications such as DST transform, which reduces a 3D regional search to a number of 1D interval searchers, Data structures with similar operations have long been studied. Examples include linked lists, binary search trees, and quite a number of well know tree based data structures. A salient example among them is the Red-Black Tree.

Black-White Array ("BWA") is an implementation of the Repo that supports the operations specified above. Unlike any tree-based solutions, BWA is completely array based, and, as such, it has avoided the need for pointer (de-) referencing and rebalancing of the tree, and thus, has saved the associated space and time cost.

A BWA with a capacity of $N=2^k$ consists of a pair of arrays Black ("B") and White ("W") of sizes N/2 and N, respectively. The entries in the B(W) array are indexed by indices ranging from 1 to (N/2)-1 (N). Both the B and W arrays are conceptually divided into segments of different ranks, where segment i contains entries with indices in the interval of $[2^i, 2^{i+1}-1]$. It follows that for a BWA of capacity of $N=2^k$, the W (B) array has a total of k (k-1) segments, and a segment of rank r holds exactly $2^r$ entries.

In the following, $Seg^w(i)$ and $Seg^b(i)$ denote the segments of rank i in the White and Black arrays respectively. A segment is said to be occupied if it is filled with inserted value(s). By definition, the highest index in Seg(i), written S(i), is given by $2^{(i+1)}-1=1<<(i+1)-1$, where "<<" is the left shift of the binary representation of an integer. The lowest index in Seg(i), written as T(i), is given by $2^i=1<<i$. The highest and lowest indices of a segment are referred to respectively as the starting (s) and terminating (t) positions of the segment.

Figure 8:
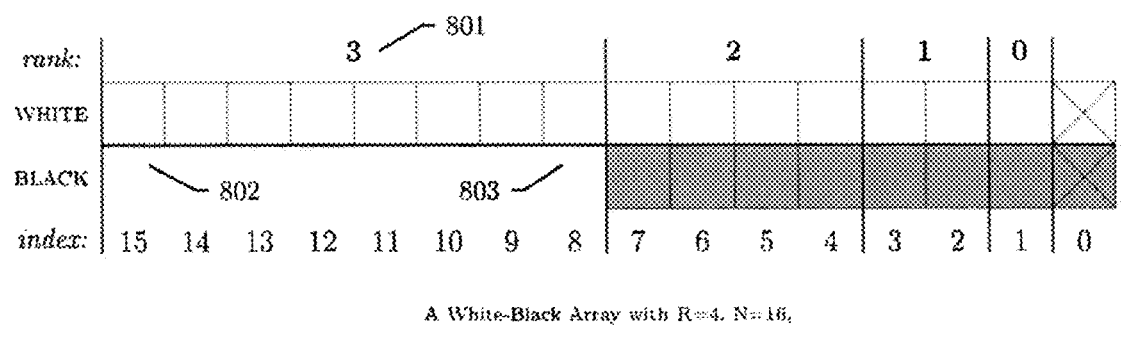

FIG. 8 provides an illustration of the layout of the BWA structure with a capacity of 16. Note that both the indices of array entries and the ranks of the segments are arranged in the ascending order from right to left. There are four white segments in the BWA, of which the leftmost has the highest rank of 3 (801). This segment has a starting position of 8 (803) and a terminating position of 15 (802) with a length of 8.

Black-White Array Operations

The insert operation is performed by the following simple and recursive rules: (1) a new value is always inserted into $Seg^w(0)$ if it is not occupied, otherwise inserted into $Seg^b(0)$; (2) for any rank i, whenever $Seg^w(i)$ $Seg^w(i)$ are both occupied, they will be merged as one sorted sequence, and put into $Seg^w(i+1)$ if it is not occupied, otherwise, put into $Seg^b(i+1)$.

Note that the "merge" above assumes two sorted sequences of the same length, and merge them into one of doubled length. In functionality, it is exactly the same as that in the well-known merge sort.

To adhere the above rules, the occupancy of the white segment of a given rank is determined. It turns out that this can be done by simply tracking the total number of values inserted. Let t be that number. Set t=0 for a new BWA, and, whenever a new value is inserted, we set t=t+1. It can then be easily proved, given the rules stated above, that $Seg^w(i)$ is occupied if and only if the ith least significant bit of t is one.

More formally, the Insert of a value v into the BWA is given below:

```
def Insert (v)
    ptr = 1;
    if (t&ptr ==0)
        W[0] = v
    else
        B[0] = v
        merge (0)
    end
    t = t+1
end
``` where t is the total number of value(s) stored int the BWA; The function merge is called which merges black and white segments of a given rank with possible recursion(s) as defined by

```
def merge (i)
    ptr = 1<<(i+1)
    if (t&ptr ==0)
        Seg^w(i+1) = merge (Seg^w(i), Seg^b(i))
    else
        Seg^b(i+1)= merge (Seg^w(i), Seg^b(i))
        merge (i+1)
    end
end
```

FIG. 9 illustrates an insert operation with the invoked recursive merging process. In this illustration, the BWA has a capacity N=16. When the new value 52 is inserted, the total t is equal to 7 (0111), indicating the three lowest ranked white segments are occupied. It follows that the new value is first put in $Seg^b(0)$ (901). This leads to a merge of $Seg^w(0)$ and $Seg^b(0)$, and the result is put in $Seg^b(1)$ (902). A merge between $Seg^w(1)$ and Segb(1) (903) followed by a merge between $Seg^w(2)$ and Segb(2) then take place successively, until the final result as a sequence is put in $Seg^w(3)$ (904).

It follows from the rules of BWA insertion that whenever the total number of inserted values is a power of two, $t=2^m$, all the values will appear in the BWA's white segment of rank m as a sorted sequence. It can also be easily proven this sorting procedure by insertion with BWA takes exactly the same number of comparisons as the well-known merge sort.

Observe that the values left in the lower ranked segments after a merge will not affect the correctness of further BWA operations, and therefore there is no need to spend the time to remove them. For example, after the insertion and merge process illustrated by FIG. 9, the total t will be increased from 7 (0111) to 8 (1000) which indicates, any value in the three lowest ranked segments are now treated as void.

The Search operation takes a value v and a rank i and searches through $Seg^w(i)$. If the value is found, the Search operation returns the index of the value, and, otherwise, returns nil. As can be seen in the definition below, it is no more than a simple binary search:

```
def search (v, i)
    if (i == 0)
        return (W[i] == v? 1: nil)
    end
    ptr = 1<<i
    t = ptr;
    ptr = ptr <<1;
    s = ptr -1;
    while (s >= t)
        m= ((s-t) >>1) +t
        if (W[m] < v)
            t = m+1
        else if (W[m] > v)
            s = m-1
        else
            return m
        end
    return nil
```

Having the search over an individual segment defined, a search over the entire BWA is now straightforward. Note that the first letter of its name is capitalized to distinguish it from the search operation over one segment.

```
def Search (v)
    ptr = N
    i = k
    while (ptr >= 1)
        if ((ptr & t) ==1)
            result = search (v, i)
            if (result !=nil)
                return result
            end
        end
        ptr = ptr >>1;
    end
    return nil
end
``` where t is the total values stored in BWA, N is the capacity of the BWA, and k=log N is the logarithm of N which is equal to the rank of the longest white segment in the BWA. Note that the search started with the white segment of highest rank of the largest size, and moves to the next occupied segment of lower rank only if the value is not found. It terminates successfully when the first index holds the value is found, or terminates unsuccessfully if the value does not exist in the BWA after all the occupied white segments are searched. Observe that an unoccupied segment would never be examined in the search process, and the occupancy of a segment i can be easily determined by looking at the ith significant bit of the total tin binary form.

The function findUb(s, t, v) (FindLb(s, t, v)) is similar to the search above. It finds the upper (lower) bound index j for the value of v. This is to say that j is the greatest (smallest) index j such that any entry with index smaller (greater) than j is equal or smaller (greater) than v. Note that findUb (findLb) would be unsuccessful (returning −1) when the smallest (largest) value between index s and index t is greater (smaller) than v. The method FindUb is next provided. The method FindLb is similarly constructed:

```
def findUb (s, t, v)
    int m = (s+t) >>1
    if (v<W[t]) return −1 end
    if ((s==t) && W[s] <<v)) return s end
    if (W[m] <=v)
        if (W[m+1] > m return m
        else return findUb(s, m+1), v)
    else
        return findUb(m−1, t, v)
    end
end
```

The search for values sitting between the 1D region [u, v], u>=v, in the white region of rank i, can now be implemented by:

```
def find (u, v, i)
    s = (1 << (1+1)) −1
    t = 1 << i
    Lb = findLb(s, t, v)
    Ub = findUb(s, t, v)
    if (Lb != nil && Ub != nil)
        return (W[LB ... UB])
```
```
    else
        return [ ]
    end
end
```

The following operation Find(u, v) is used to find all the values between [s, t] in the entire BWA:

```
def Find (u, v)
    ptr = N
    i = k
    result = [ ]
    for (ptr = N; ptr >=0; ptr = ptr >> 1)
        if (total & ptr ==1)
            result = append (result, find(u, v, i))
        end
        i = i−1
    end
end
```

In the previous section of Neighborhood Examination, operations Put(Repo, k) and Get(Repo, s, t) are referred to in methods Φ and Nbr to support 3D regional and neighborhood search based on DST. At this point, it should become clear that a BWA can be the designated Repo and that the BWA's Insert(k) and Find(u, v) methods be used to realize the Put and Get operations.

Unlike k-d tree, octree or other tree-based approaches, regional and neighborhood searches in a 3D-space based on the DST transform avoid construction, traversal, and balancing of any tree structure. The recursive decomposition works directly on the region with a time independent of the cardinality of the entire space. The precision of the DST based search generally reaches a fairly high level with a shallow depth of recursive space decomposition and with a guaranteed recall of 100 percent. The testing of the DST based methods against other state-of-art methods with public 3D data sets and point clouds has demonstrated an order-of-magnitude improvement in speed over other current methods. The BWA data repository subsumes, in functionality, both the static sorting methods, such as merge-sort, and the dynamic 1D search structures, such as the red-black tree. The BWA data repository has the flexibility of building the repository incrementally that the former lacks and avoids the cost of construction, maintenance and balance of a tree structure that the latter suffers. The joint use of DST and BWA makes the real time processing in time-critical applications, such as point cloud registration for autonomous driving, an achievable task with reasonable computational resources.

The invention claimed is:

1. A system that finds the nearest neighbors of a point in a three-dimensional data set in which each point in a set of points is represented by three coordinates and may be associated with one or more data values, the system comprising:
    a computer system having one or more processors and one or more memories:
    a dimensional shuffle transform ("DST") component that transforms the three-dimensional data set into a neighborhood-preserving one-dimensional data set in which each point is associated with a key,
    a key k corresponding to a given three-dimensional point p is obtained by a forward DST k=H(p), wherein the forward DST H( ) receives the three-dimensional point p as an argument and returns the key k as a result of carrying out the forward DST transform of p by the DST component, and the three-dimensional point p corresponding to the key k is obtained by a reverse DST $p=H^{-1}(k)$, wherein the reverse DST $H^{-1}(\ )$ receives the key k as an argument and returns the three-dimensional point p as a result of carrying out the reverse DST transform of k by the DST component;

a Black-White-array data repository; and computer instructions, stored in one or more of the one or more memories that, when executed by one or more of the one or more processors, control the system to receive a radius r and a three-dimensional point p;

determine a set S of one-dimensional points within a perfect cube, each edge of which has length 2r, that contains $k=H(p)$; and determine a result set R as the three-dimensional points corresponding to the one-dimensional points in S within a distance r of p.

\* \* \* \* \*